(12) United States Patent
Mitch et al.

(10) Patent No.: US 11,948,196 B2
(45) Date of Patent: Apr. 2, 2024

(54) ASSET MANAGEMENT TECHNIQUES

(71) Applicant: SAFEFLIGHTS INC., Houston, TX (US)

(72) Inventors: Eleanor Mitch, Houston, TX (US); Dharmesh Patel, Houston, TX (US); Christopher V. Beckman, Miami, FL (US)

(73) Assignee: Safeflights Inc., Houston, TX (US)

( * ) Notice: Subject to any disclaimer, the term of this patent is extended or adjusted under 35 U.S.C. 154(b) by 0 days.

(21) Appl. No.: 17/816,203

(22) Filed: Jul. 29, 2022

(65) Prior Publication Data

US 2022/0383717 A1    Dec. 1, 2022

Related U.S. Application Data

(63) Continuation of application No. 16/638,266, filed as application No. PCT/US2018/057546 on Oct. 25, 2018, now Pat. No. 11,410,241.

(60) Provisional application No. 62/608,325, filed on Dec. 20, 2017, provisional application No. 62/576,812, filed on Oct. 25, 2017.

(51) Int. Cl.

| | |
|---|---|
| *G06Q 40/08* | (2012.01) |
| *G06F 18/22* | (2023.01) |
| *G06K 19/077* | (2006.01) |
| *G06Q 40/06* | (2012.01) |
| *G08B 13/24* | (2006.01) |
| *H04L 9/06* | (2006.01) |
| *H04L 9/00* | (2022.01) |

(52) U.S. Cl.
CPC ............ *G06Q 40/06* (2013.01); *G06F 18/22* (2023.01); *G06K 19/07758* (2013.01); *G08B 13/2405* (2013.01); *G08B 13/2442* (2013.01); *G08B 13/2454* (2013.01); *H04L 9/0643* (2013.01); *H04L 9/50* (2022.05)

(58) Field of Classification Search
CPC ............... G06Q 40/06; G08B 13/2405; G08B 13/2442; G08B 13/2454; H04L 9/0643
See application file for complete search history.

(56) References Cited

U.S. PATENT DOCUMENTS

| | | | | |
|---|---|---|---|---|
| 2016/0078422 A1* | 3/2016 | Holmes | .................. | G07G 1/009 705/17 |
| 2017/0103468 A1* | 4/2017 | Orsini | ................... | H04L 9/3239 |
| 2017/0371074 A1* | 12/2017 | Elkabetz | ................. | G01W 1/14 |

* cited by examiner

*Primary Examiner* — Scott C Anderson
(74) *Attorney, Agent, or Firm* — Beckman Law P.C.

(57) ABSTRACT

Systems, devices and methods for monitoring and managing parts, enterprise resources and other assets, and alleviating risks, in a complex collaboration environment are provided. According to some example aspects of the invention, a device with a hardware- and software-based control system scans and/or writes unique asset-related information within a plurality of chemical, electromagnetic, or written data-bearing tags within, on or throughout an asset for use in a manufacturing, maintenance and/or tracking process. In other example aspects, the system records that asset-specific information (e.g., using secure network(s) and/or a blockchain), providing it for later access and modification by a number of trusted users, to track and control manufacturing-, maintenance-relevant or other factors. In still other example aspects, an enterprise resource planning system both outputs information to, and receives information from, the control system, reconciling changes in the data.

20 Claims, 5 Drawing Sheets

ASSET MANAGEMENT TECHNIQUES

CROSS-REFERENCE TO RELATED APPLICATIONS

This application is a continuation of U.S. patent application Ser. No. 16/638,266, filed Feb. 11, 2020, titled "Asset Management Devices and Methods" (now U.S. Pat. No. 11,410,241), which is a U.S. National Phase Filing under 35 U.S.C. § 371 from International Application No. PCT/US2018/057546, filed Oct. 25, 2018, which claims the benefit of priority to U.S. Provisional Application Nos. 62/576,812, filed Oct. 25, 2017, titled "Systems for Tracking Parts in Complex Manufacturing" and 62/608,325, filed Dec. 20, 2017, titled "Systems for Tracking Parts in Complex Manufacturing," and the above applications are herein incorporated by reference in their entirety.

TECHNICAL FIELD

The present invention relates to asset management, and, more particularly, to asset management devices, systems and methods for tracking assets from disparate sources.

BACKGROUND

Probability theory is one method for understanding and managing risks. The creation of signs (e.g., traffic signals) and more complex written language (e.g., Cuneiform in ancient Sumer, Morse Code, and modern languages) enabled the development and dissemination of new risk management systems, incorporating deliberate and specific warnings and directions to actors within an organization (e.g., a government or corporation).

In modern history, however, technology and international business have grown tremendously, along with a host of mounting and ramifying risk variables. The increasing number of variables render particular risks difficult to track and control. Thus, even as they proliferate and become more sophisticated, elaborate risk management systems still fail to prevent large-scale disasters.

Nowhere is this more evident than in industries involving large-scale manufacturing (e.g., the aviation industry).

Such industries take extraordinary precautions, with elaborate, coordinated risk management systems, yet world gripping disasters caused by errors in manufacturing and maintenance continue in the modern era. Some manufacturing and maintenance-related disasters remain under investigation decades later. In the aviation industry, for example, TWA Flight 800, a flight bound for Paris from the United States in 1996, ended in an explosion, claiming the lives of all on board. The cause is still debated today, but some believe that the explosion was related to a failed Fuel Quantity Indication System (FQIS) which perhaps could have been prevented by better risk management.

In complex industrial manufacturing and maintenance processes such as those, for example, in the aerospace industry, the availability and provision of resources is integrated with the field of enterprise resource management ("ERM"). Modern ERM requires the development of integrated approaches to managing core business processes, and the resources needed for them, including the provision of inventory, parts, maintenance services and completed products.

There is still a need for more effective risk management systems, and enterprise resource management systems, tailored to the dynamic needs of an individual group or organization, incorporating ever-changing information and legal regulations, and yielding richer, more complete data regarding manufacturing and maintenance factors in the field of aerospace. One technical problem with existing risk management systems relates to record maintenance systems. Multiple actors within an organization may alter, lose or otherwise fail properly to maintain records of assets (e.g., parts) tracked by an ERM system, for example, leading to incomplete or inaccurate records and unknown risk factors.

SUMMARY

Systems, devices and methods for monitoring and managing parts, enterprise resources and other assets, and alleviating risks, in a complex collaboration environment are provided. According to some aspects of the invention, a device comprised within or comprising a hardware- and software-based control system takes manufacturing-, maintenance-, service-, and asset-related data from an administrative system, such as an Enterprise Resource Planning system ("ERP"), and creates a digital signature based on data-bearing tag(s), which may be chemical, electromagnetic, visual-based or other tag(s) placed on, in or throughout an asset for use in a manufacturing, maintenance or other process ("data-bearing tag"). A data-bearing tag is a label, identifier, tag, particle, or any other device that contains information about an asset. The control system then combines that information about an asset with the digital signature into a new, combined data set, and inserts all or at least part of that set into a secure network and/or a blockchain, as a series of recorded values. Preferably, an insertion process into a blockchain is used, which creates a secure, encrypted identifier, separate from the digital signature, which is associated with the asset. This process creates a new identifier, for use on the blockchain, unique to the particular asset, and allows a user to trace any asset recorded by the control system, view important data related to it, and authenticate it, in real time, and to better manage the asset throughout its lifecycle within the control system. The enhanced security of the blockchain-implemented embodiment protects the asset from hacking and other security threats, making the control system substantially inviolable.

In one embodiment, a handheld device (such as a smartphone with a mobile application in accordance with aspects of the invention, and sensors) comprising or comprised in a control system scans for a unique asset-specific identifier within a plurality of small and/or hidden chemical, electromagnetic, visual and/or other signaling technology-based data-bearing tags placed on, in or throughout an asset (e.g., a part) for use in a manufacturing, maintenance or other asset-related process. The control system then takes manufacturing, maintenance and/or asset-related data from the ERP or other administrative system, and associates the asset-specific identifier for a particular asset with that asset-related data from the ERP or other administrative system. The control system may then also provide data from the data-bearing tag and provide it as output to the ERP or other administrative system. In some aspects of the invention, the control system then creates a new digital identifier and records that asset-specific information (e.g., using a secure network and/or a blockchain) along with the digital identifier, providing it for later access and modification by a number of trusted users, such as the ERP, to track asset-relevant factors, including the identity, availability, condition, location, transit status, custodial history, delivery and installation of each asset within the manufacturing, maintenance or other process.

In some embodiments, the control system is executed, at least in part, with middleware, providing output and other services to other or external hardware, operating systems and software programs (such as ERP's or other administrative systems, or subsystems thereof), and integrating its functions with them and the entire manufacturing, tracking and/or maintenance process for an asset(s). For example, the device and control system discussed above may communicate both with an ERP or other administrative system and a blockchain, to allow software systems and users external to the control system to integrate functions with the control system. In some embodiments, an ERP or other administrative system both outputs information to, and receives information from, the control system periodically, based on an intermittent network connection, reconciling changes in the data according to a unique protocol.

In other embodiments, the invention is implemented as a comprehensive, all-inclusive control system, managing the entire asset manufacturing, maintenance and/or tracking process as an ERP or other administrative system, and includes both middleware, and hardware running it, as well as software directly interfacing with a user and manufacturing and/or maintenance hardware. However, aspects of the invention are not limited to the enterprise resource planning contexts.

Further aspects of the invention will be set forth in greater detail, below, with reference to the particular figures.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments of the invention presented herein are directed to methods, systems and computer program products for tracking and managing assets (e.g., parts) in a complex collaboration environment using data-bearing tags arranged in or on a an asset to be managed by a control system, which are now described herein. This description is not intended to limit the application of the example embodiments presented herein. In fact, after reading the following description, it will be apparent to one skilled in the relevant art(s) how to implement the following example embodiments in alternative embodiments (e.g., involving a system requiring secure asset tracking and management).

Figure 1:
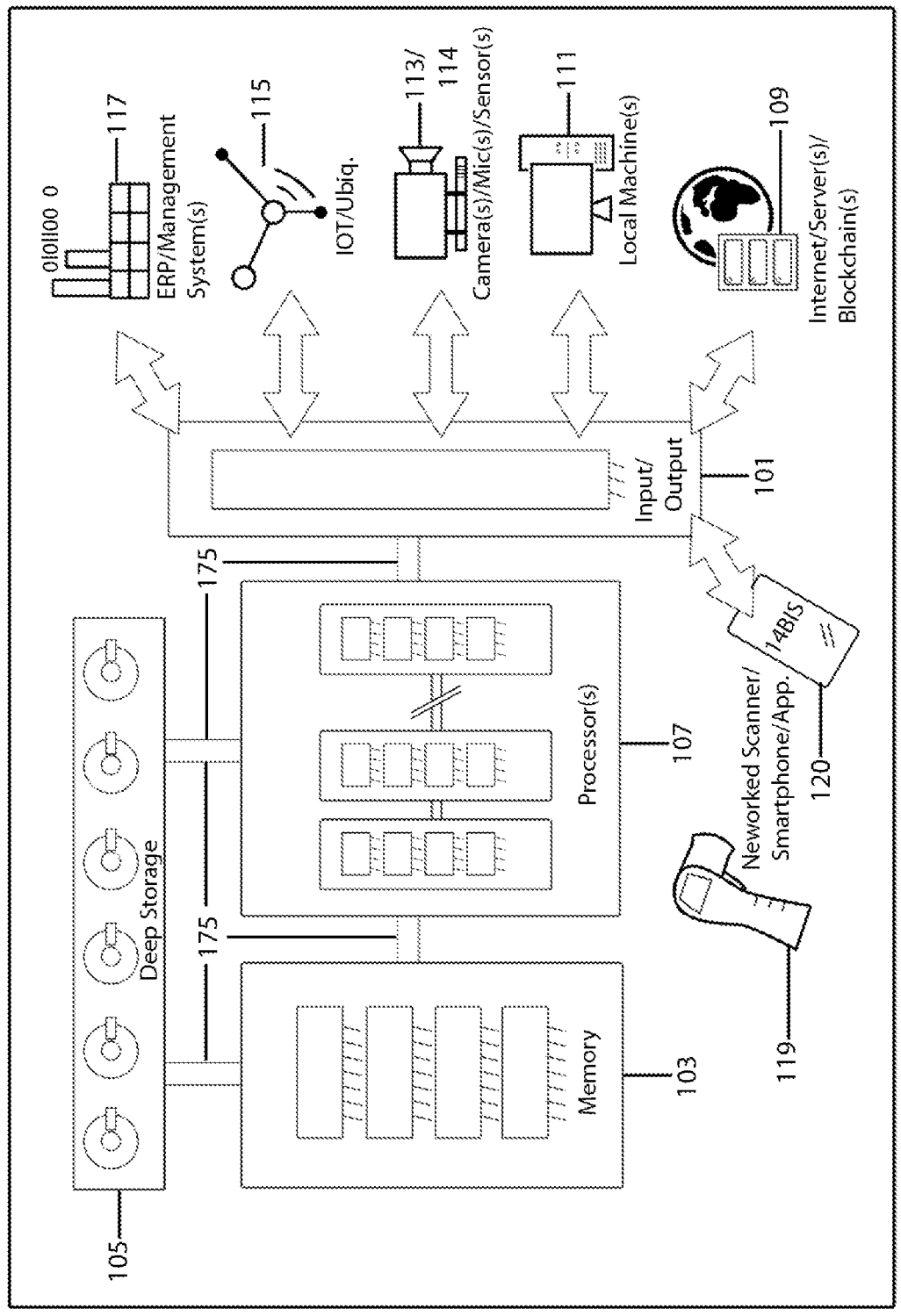
FIG. 1 is a schematic block diagram of some elements of a control system in accordance with an example embodiment of the present invention.

FIG. 1 is a schematic block diagram of some elements of a control system (hereinafter, the "system" or "control system") 100, in accordance with an example embodiment of the present invention. In some example embodiments, the control system incorporates a non-transitory machine-readable medium storing instructions, that when executed by one or more processors, execute various aspects of the present invention described herein. The generic and other components and aspects described herein are not exhaustive of the many different systems and variations, including a number of possible hardware aspects that might be used, in accordance with the example embodiments of the invention. Rather, the control system 100 is an exemplary embodiment.

Control system 100 includes an input/output device 101, a memory device 103, long-term data storage device 105, and processor(s) 107. The processor(s) 107 is (are) capable of receiving, interpreting, processing and manipulating signals and executing instructions for further processing and for output, pre-output and/or storage in and outside of the system. The processor(s) 107 may be general or multipurpose, single- or multi-threaded, and may have a single core or several processor cores, including microprocessors. Among other things, the processor is capable of processing signals and instructions for the input/output device 101, to cause a user interface to be provided or modified for use by a user on hardware, such as, but not limited to, physical hand controls (e.g., on a handheld scanning device, such as scanner 119, with a trigger to initiate scanning and/or writing of data-bearing tags) and/or a personal computer monitor or terminal monitor with a mouse and keyboard and presentation and input-facilitating software (as in a graphical user interface, a.k.a. a "GUI") (e.g., on local machine(s) 111, scanner 119 or smartphone 120).

For example, user interface aspects, such as graphical "windows," "buttons" and data entry fields, may present via, for example, a display, a selectable option. When the option is selected, such selection causes aspects of the control system to command other aspects of the control system to scan, track, access and modify data related to particular asset(s) and associated data-bearing tags, select particular products, parts or other assets managed by an ERP to scan and store information in relation to any of them, and to provide digital signatures, identification codes or information, and record them in a secure manner on a network (e.g., the Internet and/or another network incorporating a blockchain). For example, and as explained in greater detail below, the control system may command a handheld scanning device or data entry terminal, connected with the control system, to scan data-bearing tag(s) in or on an asset to be managed by the control system, and provide a secure identifier and/or other data related to the asset to the control system, where it is stored (e.g., on long-term data storage device 105, or server(s) and/or on blockchain(s) 109). A data-bearing tag is a label, identifier, tag, particle, or any other device that contains information about an asset. The processor(s) 107 may execute instructions stored in memory device 103 and/or long-term data storage device 105, and may communicate via system bus(ses) 175. Input/output device 101 is capable of input/output operations for the system, and may include and communicate through input and/or output hardware, and instances thereof, such as a computer mouse, scanning device or other sensors, actuator(s), communications antenna(ae), keyboard(s), smartphone(s) and/or PDA(s), networked or connected additional computer(s), camera(s) or microphone(s), a mixing board(s), real-to-real tape recorder(s), external hard disk recorder(s), additional movie and/or sound editing system(s) or gear, speaker(s), external filter(s), amp(s), preamp(s), equalizer(s), computer display screen(s) or touch screen(s). Such input/output hardware could implement a program or user interface created, in part, by software, permitting the system and user to carry out the user settings and input discussed in this application. Input/output device 101, memory device 103, data storage device 105, and processor(s) 107 are connected and able to send and receive communications, transmissions and instructions via system bus(ses) 175. Data storage device 105 is capable of providing mass storage for the system, and may be or incorporate a computer-readable medium, may be a connected mass storage device (e.g., flash drive or other drive connected to a Universal Serial Bus (USB) port or Wi-Fi), may use back-end (with or without middle-ware) or cloud storage over a network (e.g., the Internet) as either a memory backup for an internal mass storage device or as a primary memory storage means, or may simply be an internal mass storage device, such as a computer hard drive or optical drive. Generally speaking, the system may be implemented as a client/server arrangement, where features of the system are performed on a remote server, networked to the client and made a client and server by software on both the client computer and server computer. Also generally speaking, the system may be implemented as middleware, whereby it provides output and other services to an external system, including, but not limited to, any of the example devices and auxiliary devices and/or systems, shown as internet server(s) and blockchain(s) 109, local machine(s) 111, cameras and microphones 113, sensor(s) 114, internet of things or other ubiquitous computing devices 115, ERP 117, scanner 119 and smartphone 120. Similarly, the control system 100 is capable of accepting input from any of those auxiliary devices and systems, and modifying stored data within them and within itself, based on any input or output sent through input/output device 101.

Input and output devices may deliver their input and receive output by any known means, including, but not limited to, any of the hardware and/or software examples shown as internet server(s) and blockchain(s) 109, local machine(s) 111, cameras and microphones 113, sensor(s) 114, internet of things or other ubiquitous computing devices 115, ERP 117, scanner 119 and smartphone 120.

While the illustrated example of a control system 100 in accordance with the present invention may be helpful to understand the implementation of aspects of the invention, any suitable form of computer system known in the art may be used—for example, a simpler computer system containing just a processor for executing instructions from a memory or transmission source. The aspects or features set forth may be implemented with, and in any combination of, digital electronic circuitry, hardware, software, firmware, middleware or any other computing technology known in the art, any of which may be aided with external data from external hardware and software, optionally, by networked connection, such as by LAN, WAN or the many connections forming the Internet. The system can be embodied in a tangibly-stored computer program, as by a machine-readable medium and propagated signal, for execution by a programmable processor. The many possible method steps of the example embodiments presented herein may be performed by such a programmable processor, executing a program of instructions, operating on input and output, and generating output and stored data. A computer program includes instructions for a computer to carry out a particular activity to bring about a particular result, and may be written in any programming language, including compiled and uncompiled and interpreted languages and machine language, and can be deployed in any form, including a complete program, module, component, subroutine, or other suitable routine for a computer program.

Figure 2:
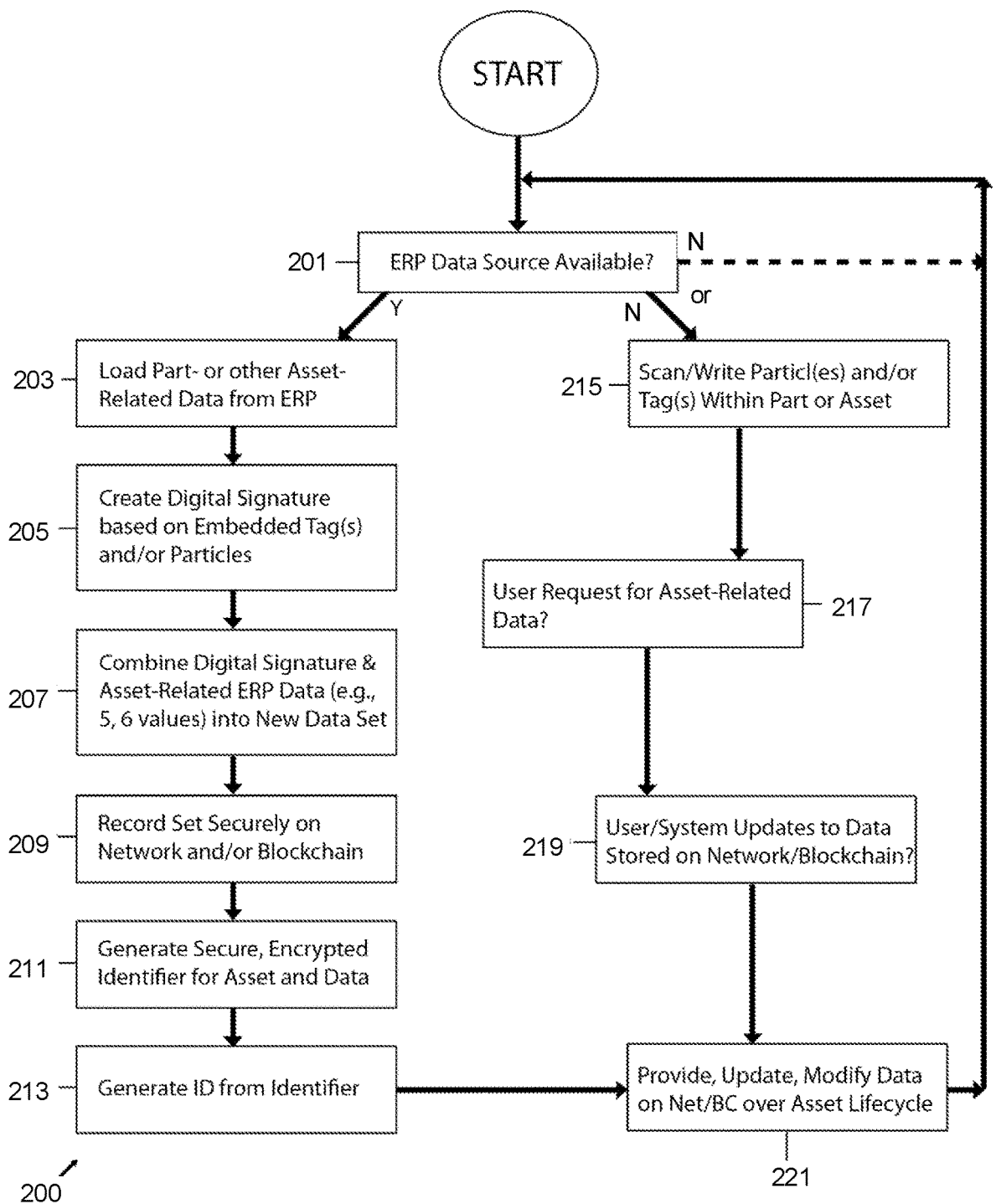
FIG. 2 is a flow diagram that shows an example process that may be undertaken by a control system in accordance with an example embodiment of the present invention.

FIG. 2 is a process flow diagram of a process 200 that may be undertaken by a control system (such as the example control system 100 set forth above, in reference to FIG. 1) implementing example embodiments described herein (e.g., through software and/or middleware.)

At step 201, a determination is made as to whether an auxiliary ERP source is activated and/or available to share (e.g., by communicating over a network connection) asset-related information with the control system. In one example embodiment, such an auxiliary ERP source may be an asset-management system, such as ERP 117, which itself may comprise another control system similar to control system 100, set forth in FIG. 1, above. If a determination is made in step 201 that no such ERP source is activated and/or available to share asset-related information, in some embodiments, the process proceeds to step 215. Step 215 is discussed in greater detail below. In an alternative embodiment, if a determination is made in step 201 that no such ERP source is activated and/or available to share asset-related information, the process restarts.

If a determination is made at step 201 that the ERP data source is available, the process 200 proceeds to step 203. At step 203, asset-related data is summoned and/or loaded from an ERP data source (e.g. ERP 117, scanner 119 or smartphone 120, etc.) for a particular asset to be recorded, managed and/or tracked using the control system 100, in accordance with aspects of the embodiments described herein. In some embodiments, such asset-related data may include, but are not limited to, a part number, a serial number, a National Stock Number ("NSN"), a CAGE code, compliance document or other information, or any other asset-related number or other data to be managed by the control system in authenticating, tracing and otherwise managing the relevant asset. At step 205, a digital signature that is unique to the relevant asset is created. The digital signature can be based on data-bearing tags placed on, within or about the relevant asset. In some example embodiments, the data-bearing tags may be hidden and/or embedded within the relevant asset. These data-bearing tags may be small, invisible or difficult to ascertain with the naked eye, but scannable, e.g., by camera(s), sensor(s), laser scanner(s), etc., communicatively coupled to the control system 100. It should be understood that other types of tags now known or future developed (e.g. of any size, attached in any way to the asset) may also be scanned and otherwise used by a component of the control system (e.g., a scanner 119) as set forth herein. As described above, the data-bearing tags may bear data in any way known in the art, by, including, but not limited to, chemical, electromagnetic and visual markers that may be scanned by the control system 100. For example, such visual markers within the data-bearing tags may include a scannable color code, in which different scannable color or color range elements correspond with data elements (for example, and without limitation, yellow standing for one (1), and green standing for zero (0), in a binary number system, or primary colors standing for three symbols, in another example system, with twelve (12) elements creating a part- or asset-specific number) to be managed by the control system. The data gathered and/or created in steps 203 and 205 are combined to form a new data set, in step 207. In turn, that new data set is recorded a distributed network (e.g., the Internet) in step 209. In some example embodiments the new data set is recorded using encryption. In some other example embodiments, the new data set is recorded using a blockchain. In some other example embodiments, the new data set is recorded using a combination of encryption, local storage media, network-connected storage media and/or storage media within a blockchain. In step 211, an identifier is generated for the relevant part or other asset, which is the basis for a newly-created identification code in subsequent step 213. In some embodiments the identifier is generated by using a blockchain. In other embodiments, the identifier is generated by using a network. In yet other embodiments, the identifier is a secure identifier. The secure identifier can be generated by encrypting the identifier using known or future developed encryption techniques such as symmetric or asymmetric encryption. In some embodiments the identifier can be a unique identifier such that the relevant asset is identified to the exclusion of any other asset managed by the system.

Put differently, in some embodiments, a control system 420 is configured to receive a first asset identifier and asset information, wherein the asset information is information about the asset other than the first asset identifier. For example, a first asset identifier may be a code identifying the asset, written within a data-bearing tag. As another example, the asset information may include the product manufacturer, current custodian, model and/or date of manufacture. In some such embodiments, at least one scanner 119 in communication with the control system 420, is configured to scan one or more data-bearing tags 412 encoded with at least the first asset identifier and to communicate the first asset identifier to the control system 420. For example, in some embodiments, scanner 119 may employ a laser or other electromagnetic scanning technology, to read the data-bearing tag and capture the first asset identifier and asset information. In some such embodiments, the control system 420 is in communication with a blockchain 417 and is further configured to combine the first asset identifier with the asset information to generate a second asset identifier, in cooperation with the blockchain 417. In some embodiments, the control system 420 is configured to combine the first asset identifier with the asset information to generate a second asset identifier, in cooperation with a network, other than a blockchain 417.

The unique identifier and yielded code can then be used indefinitely, over the relevant asset's lifetime under management by the control system 100 and/or the ERP 117, to perform various secure operations. "Secure operations" include any action by the system related to a managed asset in which the action or actors are recorded and access to records is controlled by data-securing techniques. For example, in some embodiments, secure operations include tracking, or tracing the custodial history or provenance of an asset with encrypted data. In some embodiments, secure operations include authenticating an asset, based on secure, encrypted data. In some embodiments, secure operations include enriching or updating data records related to the asset (e.g., with new observations or condition-relevant data). Generally, secure operations may include any actions by an ERP 117 or other system to maintain and/or manage the relevant asset by reading and writing data from the network and/or blockchain with the required unique identifier (and, in some embodiments employing an additional authentication layer for asset-related actions, including a required security key). In some embodiments, a security key may comprise username and password protection. In some embodiments, a security key may be multi-factorial, as with two- (2-) factor authentication.

For example, and returning now to step 215, data is scanned from or written onto, the relevant asset's embedded data-bearing tag(s), and the asset is identified, and if the other data steps set forth as step 203, step 205, step 207, step 209, step 211 and step 213 have previously been conducted for that asset, all asset-related data may be summoned and reviewed (e.g., on a display), and stored on the network, server(s) and/or on blockchain(s) 109 and/or ERP 117, in step 217. Further, that asset-related data may be updates, modified, added, deleted to or otherwise altered for example, in the same locations, in step 219. Those steps, including but not limited to data reviewing and modification steps, may be conducted, at least in part, on a specialized auxiliary computer unit. In some embodiments, such a specialized auxiliary computer unit may be handheld (such as a smartphone or PDA comprising, or networked for communications with, the control system.) In some embodiments, such an auxiliary computer unit may be specialized to carry out those steps via software creating a GUI (e.g., a GUI generated on application software which allows a user to call up, review and modify data entries in an ERP or in the blockchain). The level of granularity in data presentation and modification options may be custom tailored to a particular user or to the system's needs or determinations. For example, in some embodiments, a user or an administrative user with exclusive permission and authentication credentials to do so creates a set of data and data enhancement presentation and modification options. For example, for a novice user, a simpler interface may be created and used, in lieu of complex details regarding the identification and traced provenance of the asset. Such a simpler interface may also be presented on the screen of a customized PDA, networked with the control system, and may present a simple indicator, showing that a scanned asset has a verified provenance from an approved supplier or does not. In some embodiments, a visual indicator may be presented on a display to indicate whether such a verified provenance exists (e.g., a green indicator for a verified provenance and a red indicator for unverified provenance). Such a simpler interface may omit the display of more detailed information regarding the asset and its history in the ERP, in some embodiments. Of course, these embodiments are only examples of the wide range of options for data management, review and modification applications that will be readily apparent to a person of ordinary skill in the art implementing the present invention.

After each of the user- and system-based steps set forth as 201 through 221 have been executed, the process restarts.

Figure 3:
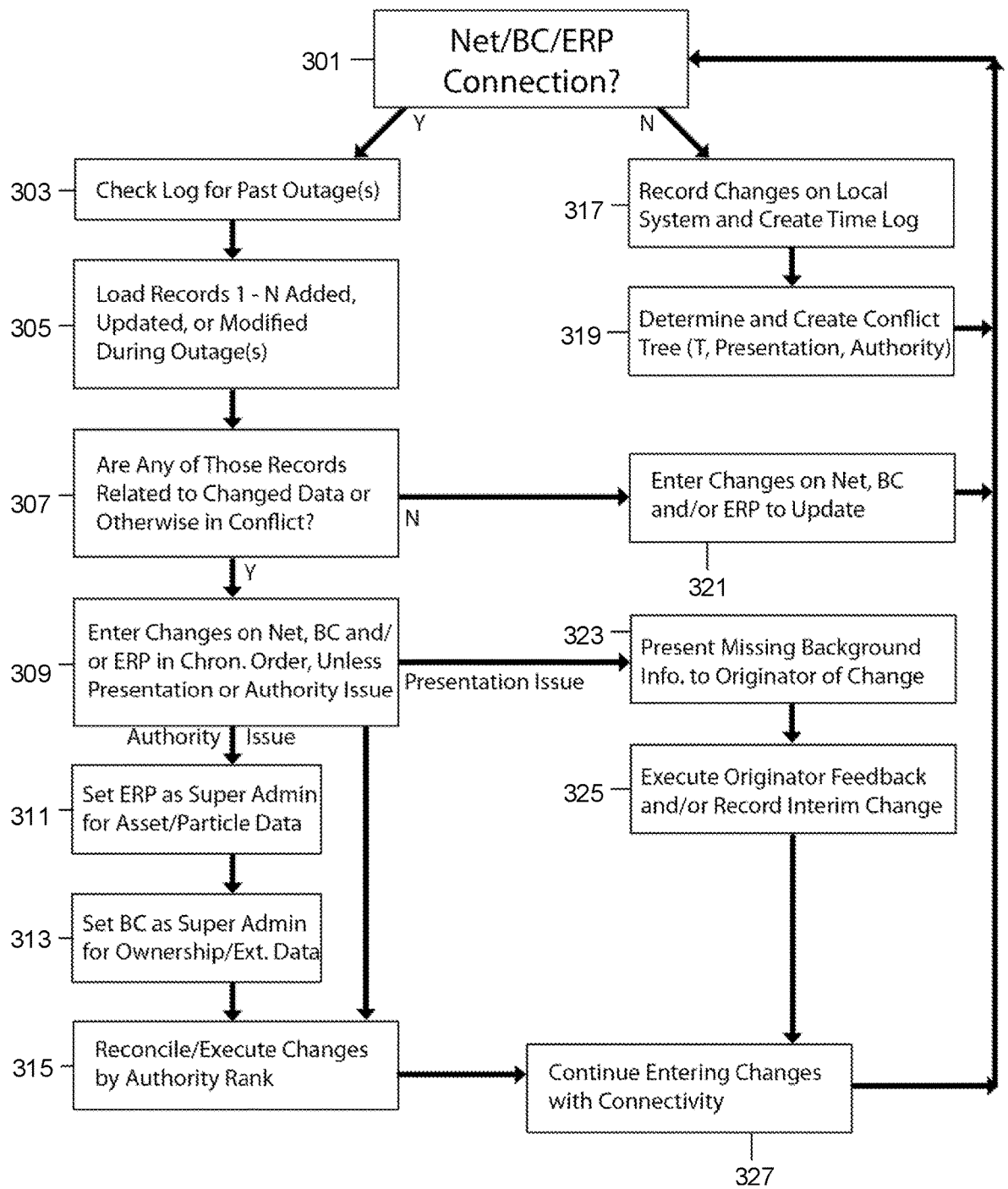
FIG. 3 is a flow diagram that shows an example process that may be undertaken by a control system according to an example embodiment of the present invention.

FIG. 3 is a process flow diagram setting forth an additional process 300, that may be undertaken by a control system (such as the example control system 100 set forth above, in reference to FIG. 1) in conjunction with a computer network and an ERP 117, in accordance with an example embodiment of the present invention.

Generally, and as discussed above, the example procedures set forth herein may be carried out via software, such as middleware, and a number of systems configured for communications. For example, the example systems, such as control system 100, may be configured for communications over one or more networks (such as the Internet). In other embodiments, the example systems may comprise, or be comprised within, one or more ERP's, such as ERP 117. Such different system and hardware arrangements may experience network connectivity lapses, depending on both controllable and unpredictable network conditions, such as network uptime, maintenance, and signal strength. For example, in some embodiments, communications connections may be intermittent between any of the one or more systems. In other embodiments, connections may be intermittent between hardware components. In other embodiments, connections may be intermittent between one or more systems and one or more hardware components. Even when relatively constant network connections are possible, some embodiments of the invention may involve other execution issues, such as intermittent and/or delayed communication or execution of commands for other reasons. For example, in some execution issues, a bottleneck may need to be avoided. In other execution issues, non-standard software and data transmission from various ERP's, such as ERP 117, and other network inefficiencies, may occur. As a result, delayed execution by a system, such as control system 100, an ERP, such as ERP 117, or a network of which both or either are a part, may occur. Also as a result, intermittent disconnection between such a system, an ERP and a network, of which either or both are a part, may occur at various times when implementing aspects of the present invention. During those times, various data changes related to the management of assets, data-bearing tags and other aspects of the present invention may occur within the control system, the ERP, the network of which either or both are a part, or within an aspect of any of them (such as the Internet and a blockchain) which cannot be immediately transmitted and reconciled. Thus, for example, in steps 219 and 221, it may not be possible to immediately receive or transmit new, updated or modified data. Similarly, the different control system of an ERP, such as ERP 117, or on a network (either of which may be or may, comprise a control system similar in nature to the control system set forth in FIG. 1, above in some embodiments) may not be able to immediately transmit or receive new, updated or modified data, at all times.

Accordingly, FIG. 3 explicates some additional procedures which may be taken in light of such network connectivity lapses and other execution issues. In some embodiments, procedures for reconciling data discrepancies are provided. In other embodiments, procedures for reconciling data incompleteness are provided. In still other embodiments, procedures for reconciling other irregularities also may be provided.

At step 301, a determination is made whether there is such a connectivity issue. For example, in some embodiments, a determination is made as to whether the control system 100 is disconnected from or otherwise unable to communicate with the ERP 117, or vice versa. In some embodiments, a determination is made as to whether control system is unable to communicate with a larger network, such as the Internet and/or a blockchain. In some embodiments, such a blockchain may be configured to store or otherwise manage ERP-related data. If any connection between any of the control system 100, ERP 117, the network(s) and/or a blockchain(s) 109 is established, steps 303 et seq. follow, in which, among other things, a log of data related to any prior loss of connectivity is recorded. If any such connection is not established, steps 317 follows, in which that log related to network outages created. Rules are then established for resolving data conflicts ("deconflicting" data), at step 319. In some embodiments, a log is created of each and every loss of network connectivity between any aspect of the network and any other aspect of the network. In some embodiments, such a log includes a record of the time the outage started and/or ended. In other embodiments, such a log includes a record of which aspects where affected by the outage. In some embodiments, a decision tree or other software routine is loaded. Such a decision tree or other software routine may incorporate a set of rules for deconflicting data changes that occur during the outage, as will be discussed in greater detail below. In some embodiments, those rules may be altered, based on which particular type of outage they apply to. In other embodiments, those rules may be altered, based on which aspects of the network are affected. In some of such embodiments, those rules may then be applied to changes made during a particular outage, once a network is reestablished. In some embodiments, such rules are applied in accordance with instructions. In some such embodiments, the system may be configured to receive instructions from a user and/or administrator. In other such embodiments, the system may be configured to receive instructions from the system.

Turning to Step 303 et seq., if it is determined, based on such a log, that such network outages have occurred, all sequential records of any added, updated or modified data entries taking place during such outages are loaded, in step 305. In other words, if any additions, updates or modifications to the data set that are to be communicated through the intermittent connection have been made, or have been attempted, but, due to an outage, have not been communicated, those changes are summoned and queued for reconciliation, upon reestablishing that intermittent connection. In some instances, those additions, updates or modifications ("changes") originate from a control system or aspect of a control system that was segregated from other control systems or aspects. In some such embodiments, such a control system or aspect of a control system itself originates other changes to the same records, during the outage. As a result, in some embodiments, the changes in question may relate to records that have already been subjected to preexisting, unreconciled changes by another part of the system. Those preexisting, unreconciled changes may result in contrary, disagreeing or otherwise conflicting data records, as assessed in step 307. In some embodiments of the invention, different records are stored for each of the unreconciled changes, allowing an administrator to see each of them in a display aspect. In some such embodiments, the display aspect may present the time of recordation of each unreconciled change. In other such embodiments, the display aspect may present data indicating the user, if any, that originated the unreconciled change. In other such embodiments, the display aspect may present data indicating the hardware aspect that originated the unreconciled change. Users or hardware aspects that originate such an unreconciled change may be referred to hereinafter in this application as an "originator." In some embodiments, data is deconflicted without presenting such a display aspect, pursuant to a set of pre-existing deconfliction rules. In some such embodiments, such deconfliction rules may be created by the ERP 117. In some embodiments, the system may be configured to permit an administrator user of the ERP to create such deconfliction rules. Thus, in step 309, for example, conflicting changes may be entered in chronological order, leading to the entry of the most recent change, while preserving aspects of earlier changes which do not conflict with them. In some embodiments, changes entered in chronological order are so entered across all networked aspects of the system (e.g., the ERP, control system, and entire network). Alternatively, or, in addition, particular types of conflicts between unreconciled changes ("issues") may be determined, in step 309, and overriding or conditioning attributes may be assigned, based on the origination of the conflicting changes. For example, in some instances, an "authority issue" may arise, in the sense that the conflicting, unreconciled changes result from two different users or aspects of the network, with differing levels of authority to make changes. In some such embodiments, such differing levels of authority are determined by the control system. In some such embodiments, such differing levels of authority are determined by a system administrator. In one embodiment, the ERP is given "super administrator" privileges in subsequent step 311, meaning that the change(s) originating from it will override conflicting, unreconciled changes originating elsewhere (e.g., elsewhere on the network). In some such embodiments, such super administrator privileges apply with respect to particular subject matter of the conflicting, unreconciled changes. For example, if such changes relate to ERM assets and tagged particle data (objects directly tracked by ERP 117), such super administrator privileges may apply, in some embodiments. Similarly, in some embodiments, other aspects of the network may be given superior editing privileges (authority) with respect to other subject matter of conflicting, unreconciled changes. For example, in step 313, unreconciled changes originating from any of blockchain(s) 109 may override conflicting unreconciled changes from ERP 117, if the unreconciled changes relate to ownership of assets and other data managed more directly by such external aspects of the network as blockchain(s) 109. In some embodiments, another form of deconfliction rule may relate to lapses in presentation of contextual data ("presentation issues"). As with other forms of unreconciled changes, unreconciled changes caused by such presentation issues may arise, at least in part, from network connectivity lapses and other execution issues. For example, if similar, albeit slightly differing, changes to data are made in different aspects of system 100 during a network outage, it may be, in part, due to users' of those different aspects being mutually ignorant of one another's actions. For example, a later changing user may be ignorant of an earlier user's change when executing his or her later change. If the later user had known of the earlier user's change (in other words, if not for the network outage), he or she may not have intended to make the subsequent change. Thus, that earlier user's change was missing context, and a presentation issue exists. In some embodiments, special rules may be implemented to deconflict unreconciled changes caused by such a presentation issue. As one approach, in accordance with some embodiments, in step 323, it is determined whether there is a similarity between two conflicting changes. For example, such similarity may be determined by using confidence interval matching of data from each unreconciled change. In some embodiments, the earlier user's change may be entered, and missing contextual data of that earlier change is presented to the second user. For example, that missing contextual data may be an explanation (presented on a display, e.g., through a GUI aspect) that the earlier user "already made a change similar to your proposed change." In other embodiments, that missing contextual data may include an explanation that the earlier user made that "similar" change at a particular, earlier time. In some embodiments, a request can nonetheless be made that the later change be entered. In some such embodiments, alterations to the later change may be executed, based on the greater context of the contextual data, through a GUI aspect permitting the entry of additional feedback as input. For example, in some such embodiments, a selection option of a GUI may permit a command to execute the original, or an updated, change, which is then executed in step 325. In some embodiments, an interim change is also recorded. For example, such an interim change may reflect an earlier change not yet overridden by a later change through a GUI aspect permitting user feedback, unless and until that feedback is received.

Whether a presentation issue, authority issue, or other type of conflict exists, each of the unreconciled changes are, thus, reconciled and executed, in accordance with the particular series of such rules for deconflicting data. In some embodiments, such rules which may themselves be altered by input, in step 315. In some embodiments, that input may be entered through a GUI of the system 100. In other embodiments, the control system itself may alter such rules. In some such embodiments, the control system may alter such rules based on network conditions and input.

Following the reconciliation of all of the changes attempted during network connectivity lapses and other execution issues, changes continue to be entered and other actions continue to be carried out, as set forth in this application when the system is fully connected with the ERP and network, in step 327, before the process restarts.

As with the processes and steps set forth above, in FIG. 2, the embodiments set forth above are only examples of the wide range of options for data management, review and modification applications that will be readily apparent to a person of ordinary skill in the art implementing the present invention. No example provided in this application should be read as a limitation of any claim. The invention may be implemented in any suitable combination, and with any aspect set forth above, including other and/or more general variations.

Figure 4:
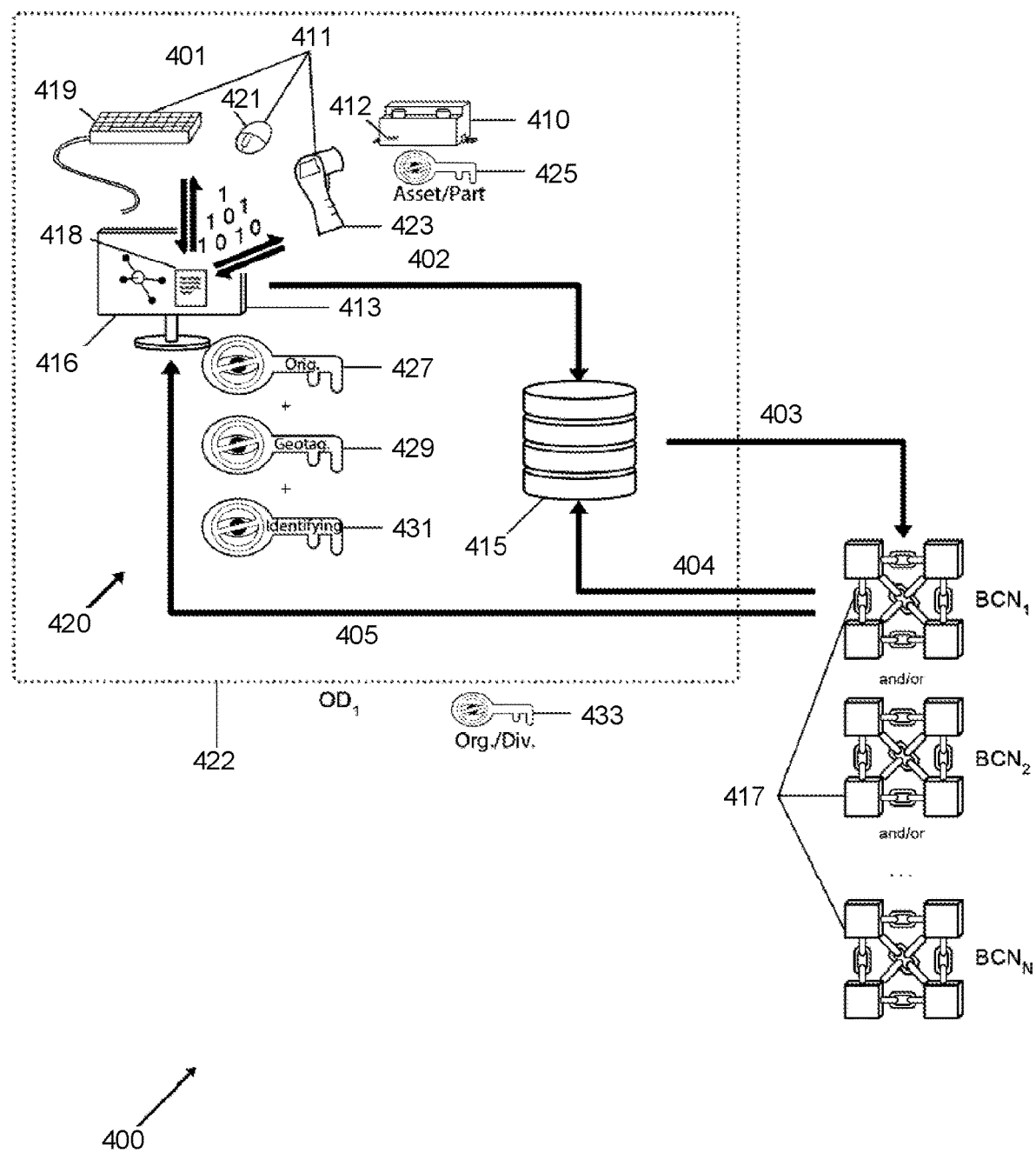
FIG. 4 is a schematic block diagram of an example environment and process in accordance with an example embodiment of the present invention.

FIG. 4 is a schematic block diagram of an example environment 400 and process in accordance with an example embodiment of the present invention. A series of example process steps, including step 401, step 402, step 403, step 404 and step 405, are shown, as well as several example environmental components—namely, example input device(s) 411, example asset 410 (including an example data-bearing tag(s) 412), local control system 413, database(s) 415, and blockchain(s) 417. In some embodiments, local control system 413 and database(s) 415 may be referred to as a control system 420, and may be held as property of an organization or organizational division 422, such as a manufacturing division of a corporation. As will be discussed in greater detail below, depending on the nature of the organization and its organizational division 422, and the permissions granted and the successful execution of authentication protocols identifying and verifying users of the system 420, the system 420, another control system comprising or comprised within system 420, and blockchain(s) 417 provide different levels of reading and writing access to data that is managed by control system 420 or the other control system. As will be discussed in greater detail below, different organizations, organizational divisions, employees or other users of the organizations, and assets themselves (any of which may be referred to as "potential actors"), among other things, may also hold individual private keys which are read by the control system and/or blockchain(s) 417 to determine what type of reading and writing access will be granted and executed by any of those potential actors. Some of those keys are configured to grant access of a particular kind to a particular asset, user, or set of users. For example, in some embodiments, access to read data is provided, based on the identification of an asset, user or set of users seeking that access. In other embodiments, privileges to write or otherwise modify data is provided to an asset, user or set of users entering commands to write or otherwise modify data, based on the identification of an asset, user or set of users triggering such commands to the system 420.

In some embodiments, local control system 413 includes hardware and software that associates and records asset-related identifiers and other data. In other embodiments, control system 413 then interfaces with input devices (such as input devices 411) and additional data storage facilities (such as database(s) 415) and networks, including, but not limited to, networks communicating with blockchains (such as blockchains 417). For example, local control system 413 may be, or may comprise or be comprised within, the control system 100 set forth above, in reference to FIG. 1. Example input devices 411 that may provide part- or other asset-related data to control system 413 are shown—namely, a computer keyboard 419, a computer mouse 421, and an identification tag scanner 423. In some embodiments, identification tag scanner 423 may scan or otherwise read and/or transfer data from data-bearing tag(s) 412, on or in an asset, such as example asset 410. It should be understood that the example input devices, namely, computer keyboard 419, computer mouse 421 and identification tag scanner 423, as well as example asset 410 and data-bearing tag(s) 412, are merely examples of the possible input devices, assets and data-bearing tags that may be used. Any device that is now known or future developed that is capable of generating data related to assets may be controlled by and connected for communications with, and used by, control system 413 to generate and record data related to assets managed and tracked by the control system 413 (or a control system comprised or comprising and/or controlled by or controlling control system 413). Likewise, any asset that may be generated or managed by an ERP or other organization or user may be labeled or otherwise tagged or embedded with any known form of data-bearing tag. For example, in some embodiments, an asset may be labeled with a visible code, such as a QR code or bar code labels. In some embodiments, an asset may be labeled with data-bearing tags that are scannable particles comprising coding. In such embodiments, those particles may be sprayed on or integrated with any physical asset. In some embodiments, digital assets may be labeled with an embedded code. For example, in addition to physical parts, such as the battery shown as example asset 410, digital or other informational assets, such as example document 418, or a virtual asset, may be labeled or otherwise associated with data-bearing tag(s) 412 which may be present in encoded form. Although data-bearing tag(s) 412 are shown as visible, and potentially readable by a human user (who may then enter data read from it into local control system 413 and, thus, system 420 within an organization or organizational division 422) it should be understood that, in some embodiments, data-bearing tag(s) 412 may be invisible or illegible to the naked eye of a human user. In some embodiments, data-bearing tag(s) 412 may comprise or be written with a particular encrypted private key referred to hereinafter as an asset private key 425, associated uniquely with the particular asset, such as example asset 410, as will be discussed in greater detail below. To extend these specific examples, the local control system 413, or a user of local control system 413, may command identification tag scanner 423 to scan a unique data-bearing tag or other device comprising a unique identifier in, on, or about an asset to be tracked and managed by local control system 413. That unique identifier may then be associated with that particular asset. For example, in some embodiments, the control system 420 is configured to receive input including identifiers and asset-related data which was created by another input device and stored within a memory device within local control system 413. In other embodiments, control system 420 is configured to receive that input by pre-populated asset-related data entered using the control system 420. In some embodiments, those data are stored within another database, such as database(s) 415, which may be dedicated to recording such identifiers and asset-related data. As another example, a user may key in and or hand-write such asset-related data, using example computer keyboard 419 and/or computer mouse 421. Thus, a user may, in some embodiments, read a unique identifier (such as a series of numbers) on a visible data-bearing tag on or about an asset, and manually enter that number, associating it with a particular asset, using any of computer keyboard 419, computer mouse 421 and/or a graphic display 416. In some embodiments including graphic display 416 in control system 420, graphic display 416 includes a specialized GUI for recording identifiers. In some embodiments, graphic display 416 includes a specialized GUI configured to receive other asset-related information. In some embodiments, any of these asset-related data input and recordation activities may take place in an initial process step 401, in which asset-related data are recorded and associated with a unique identifier for that asset. In some embodiments, those assets and related data are later tracked and managed in accordance with aspects of the present invention set forth in this application. In some embodiments, the asset private key 425 must be read, relayed and authenticated prior to any further data access or changes being permitted by local control system 413, control system 420 and/or blockchain(s) 417. Also in some embodiments, any aspect of control system 420 or of another actor with respect to an asset managed by control system 420 may not insert or generate a new asset for tracking or other management without permissioning and successful authentication. For example, in some embodiments, local control system 413 is not permitted by control system 420 to insert or generate a new part or asset for tracking or other management without permissioning and successful authentication. In other embodiments, control system 420 will not provide access to an actor presenting a private key for an organization or organizational division 422 without permissioning and successful authentication. In other embodiments, system 420 may not insert or generate a new asset for tracking or other management without permissioning and successful authentication by the control system 422. In some other embodiments, such authentication routines are carried out, at least in part, by at least one of blockchain(s) 417. In some embodiments, this permissioning and authentication before inserting or generating a new asset for tracking or other management requires that the actor hold, present and authenticate another private key for that purpose (a.k.a. an origination private key 427.)

Similarly, even when not inserting or generating a new asset, other asset-managing activities set forth in this application for control systems may be similarly subject to permissioning and authentication. In some embodiments, that permissioning and authentication is executed according to rules set by an administrator. For example, a user (such as an employee), an organization or an organizational division (an "actor") may be required to hold and present, or enter, another particular encrypted private key into the control system prior to entering geotagging information, or other information related to a particular asset's current location in space, into the control system (a.k.a. a geotagging private key 429). As another example, such an actor must present another form of encrypted private key, identifying the actor and his or her status and permissions, prior to providing access to or writing privileges in accordance with his, her or its status and permissions, as set by the control system and/or administrator (a.k.a., an identifying private key 431.) An organization private key 433, is one form of identifying private key, identifying and authenticating the organization attempting to gain access to, read, or write data related to an asset, when presented to the local control system 413, control system 420 or one of blockchain(s) 417. Other forms of identifying private key may include an "employee or other user private key," as discussed in greater detail below.

In a subsequent process or method step 402, the control system 420 may record the unique identifier and other asset-related data within local control system 413. In some embodiments the control system 420 may record the unique identifier and other asset-related data within another database, such as database(s) 415. In some such embodiments, such a database may be dedicated to recording such identifiers and asset-related data. Database(s) 415 may comprise any hardware, architecture and software known in the art and suitable for storing data for access and use in computer software and hardware applications. For example, and without limitation, database(s) 415 is written in SQL, NOSQL, NEWSQL in some embodiments. In other embodiments, database(s) 415 is written in any other database language. In some embodiments, database(s) 415 writes data within a local server or server(s). Database(s) 415 may be connected with, or variably connected and disconnected with, the remainder of local control system 413. In some embodiments, such connections depend on environmental conditions. For example, in some embodiments, temporary network or other communications outages may affect the connection of database(s) 415 to control system 420. In some embodiments, such data recording may occur when communications are established (e.g., with saved packets of data, saved and routed as needed through any suitable networking technique known in the art, or known in the future.)

The local control system 413, database(s) 415 and/or blockchain(s) 417, as the case may be, then records those same data, (i.e., the unique identifier and other asset-related data generated by the user, control system 420 and/or input device(s) 411) on one or more of blockchain(s) 417, in step 403. In some embodiments, the local control system 413, database(s) 415 and/or blockchain(s) 417, as the case may be, records some, but not all, of those data, on one or more of blockchain(s) 417, in step 403. Generally speaking, the step of recording on one or more of blockchain(s) 417 may be considered complete if and when at least one of blockchain(s) 417 has recorded the data, and generated the additional identifier. However, in some aspects of the invention, the process is not complete until an additional step, 404, occurs, in which additional data, describing or otherwise related to the recordation transaction at the at least one of blockchain(s) 417, are sent from the at least one blockchain(s) 417 to the database(s) 415, where that additional data is recorded. For example, in some embodiments, the at least one of blockchain(s) 417 may generate a confirmation of that activity, sent back to the control system 420 from that at least one of blockchain(s) 417. In some such embodiments, such a confirmation identifies the transaction and asset-related data that has been recorded on the at least one of blockchain(s) 417. As described herein, these data may include a second, unique, encrypted identifier (such as one half of a public/private key pair generated by the at least one of blockchain(s) 417).

In a subsequent step 405, any user of the blockchain(s) 417 or control system 420 (or the control system 420 or blockchain(s) 417 themselves) may query the control system 420 and/or blockchain(s) 417, to review and/or verify data related to the asset managed by the control system 420. In some embodiments, the control system 420 is queried via a search subsystem. In other embodiments, the blockchain(s) 417 is queried via a search subsystem. In some embodiments, such a search subsystem is queried using Boolean logic.

As with other methods and processes set forth in the present invention, any or all of the above steps may be repeated indefinitely, with respect to any asset controlled by the control system 420, to track any number of assets managed by the control system 420. It should also be noted that the precise order and number of steps set forth with respect to any process or method set forth in the present application are only examples, and that different orders and numbers of the steps set forth, and additional steps, may be implemented, within the scope of the present invention.

Figure 5:
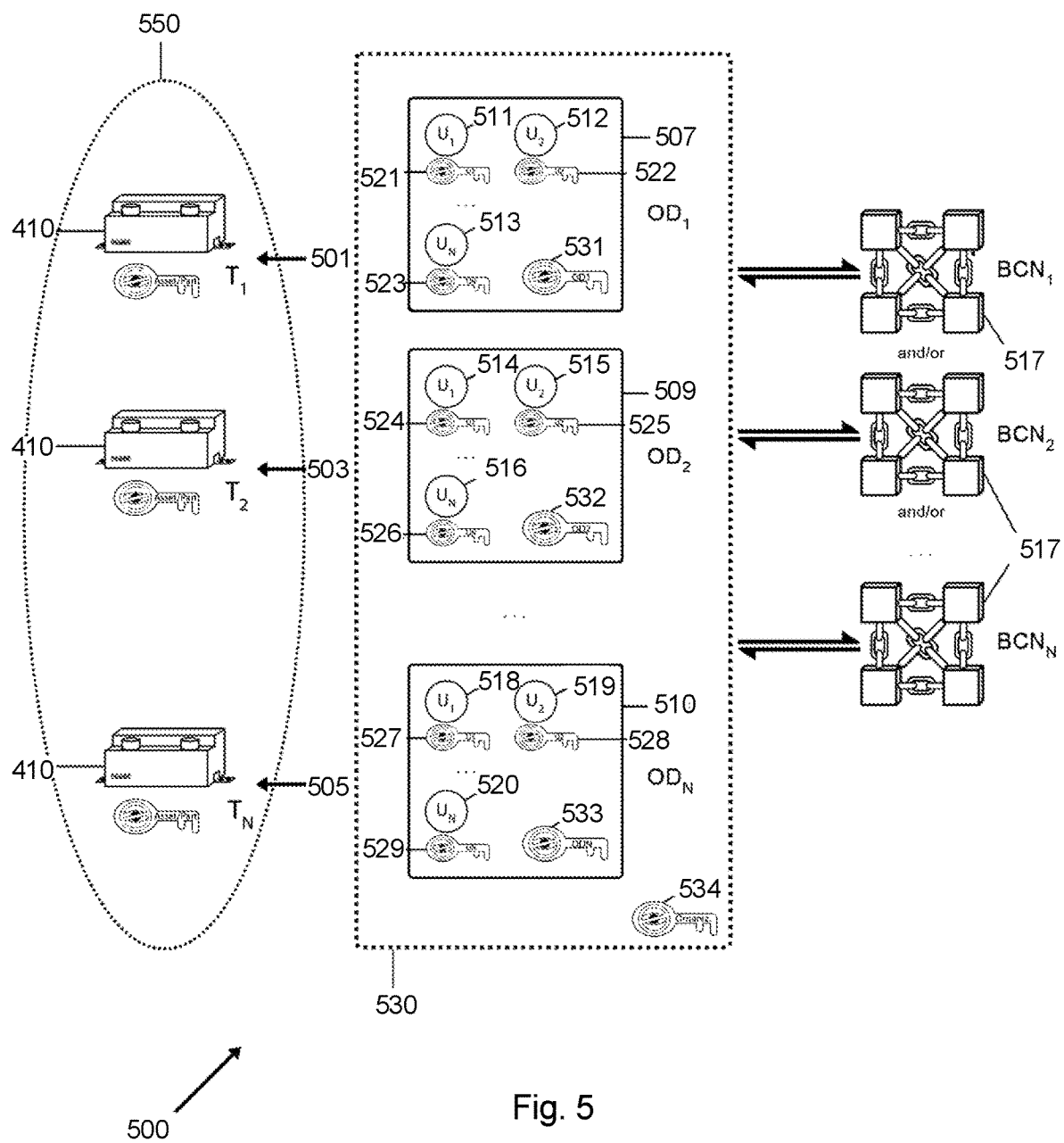
FIG. 5 is a schematic block diagram of an example environment and process in accordance with an example embodiment of the present invention.

FIG. 5 is a schematic block diagram of an example environment and process 500, depicting management of an asset over time in accordance with an example embodiment of the present invention. As shown in section 550 of the figure, an example asset 410 is being tracked and/or otherwise managed at different time intervals—namely, a first time ("T1," shown as example instance 501), a second time ("T2," shown as example instance 503), and any number of additional times (through an example instance "TN," shown as example instance 505.) It should be understood that, in some embodiments, asset 410 is tracked by control system 100. In other embodiments, asset 410 is managed in other ways. For example, in some such embodiments, any maintenance of asset 410 is recorded. In other such embodiments, the custodial history, including an identification of any actors in possession of asset 410 at any time, is recorded. As also shown in the figure, each instance, including example instance 501, example instance 503 and example instance 505, may be the occurrence of a tracking, maintenance or other asset management event by a control system, such as control system 420, implementing aspects of the present invention. In some embodiments, each of those events may be carried out by different organizations, organizational divisions, or other actors. For example, example instance 501 may be an event (such as maintenance of part 401) carried out by a first organizational division ("OD1"), shown as organizational division 507, while example instance 503 may be an event carried out by a second organizational division ("OD2"), shown as organizational division 509, and so on, through a series of events ending with a final or latest event, carried out by another organizational division ("ODN"), shown as organizational division 510.

According to some aspects of the invention, each organizational division, such as organizational division 507, organizational division 509 and organizational division 510, as with the organizations and organizational divisions discussed elsewhere in this application, hold different levels of permissions (as mediated by different encrypted private keys) with respect to data related to an asset controlled by the control system 420. For example, in some embodiments, different private keys are issued to such organization(s) or organizational division(s) which, when provided to the control system 420, create data access, read, write or other privileges in accordance with the particular level provided by the control system 420 for each particular private key. In some such embodiments, the control system 420 manages data related to an asset controlled by the control system 420, in accordance with a rule set enforced by the control system 420. Similarly, and also as discussed elsewhere in this application, each organizational division, such as organizational division 507, organizational division 509 and organizational division 510, may act through employees and other users, who themselves each may hold different encrypted private keys, identifying each of them and/or their level of permissions, in some embodiments.

For example, organizational division 507 includes several individual employees or other users, including user 511, user 512 and through to any ultimate number of users, noted as an "Nth" user 513. Similarly, organizational division 509 also has several employees or other users, including user 514, user 515 and through to an "Nth" user 516, and organizational division 510 has several employees or other users, including user 518, user 519, through to an "Nth" user 520. Each of these employees or other users—namely, user 511, user 512, "Nth" user 513, user 514, user 515, "Nth" user 516, user 518, user 519, and "Nth" user 520—is shown as having his, her or its own different, encrypted private key, shown as private key 521, private key 522, private key 523, private key 524, private key 525, private key 526, private key 527, private key 528, and private key 529, which may be associated by a control system, such as control system 420, carrying out aspects of the present invention with that particular user's permissions to access, read, write or otherwise manage data related to an asset controlled by a control system, such as control system 420.

Likewise, each organizational division, such as organizational division 505, organizational division 507 and organizational division 509, and the organization as a whole, shown as organization 530, is shown as having its own different, encrypted private key, shown as private key 531, private key 532, private key 533 and private key 534, which may be associated by a control system, such as control system 420, carrying out aspects of the present invention with other particular permissions to access, read, write or otherwise manage data related to an asset controlled by a control system, such as control system 420.

What is claimed is:

1. A system for managing a plurality of assets, comprising:
    a control system configured to:
        create a first asset identifier of an asset, wherein the asset-specific identifier is unique, and
        receive asset information, wherein the asset information is different from the first asset-specific identifier;
    at least one scanning device in communication with the control system, including:
        hardware configured to:
        read data related to at least part of said asset, and
        recording the first asset-specific identifier into a memory of the control system;
        wherein the control system is in communication with a network and is configured to:
            provide an authentication and/or authorization protocol as a precondition to recording said first asset-specific identifier or said asset information;
            record, when the precondition is satisfied, said first asset-specific identifier or said asset information on one or more blockchain(s); and
            deconflict pre-existing, unreconciled data changes arising during a network outage from new data changes based on whether the pre-existing, unreconciled data changes differ from the new data changes due to a presentation issue or an authority issue.

2. The system according to claim 1, wherein the control system is configured to:
    determine, when said pre-existing, unreconciled data changes and said new data changes differ due to a presentation issue, whether a similarity exists between said pre-existing, unreconciled data changes and said new data changes; and
    present, when the similarity is determined to exist, contextual information regarding that similarity to a user via an interface.

3. The system according to claim 1, wherein the control system is configured to:
    determine, when said pre-existing, unreconciled data changes and said new data changes differ due to an authority issue, a subject matter of said pre-existing, unreconciled data changes and said new data changes;
    determine an authority ranking, based on said subject matter, and
    deconflict said pre-existing, unreconciled data changes and said new data changes based on the authority ranking.

4. The system according to claim 2, wherein the control system is configured to:
    determine, when said pre-existing, unreconciled data changes and said new data changes differ due to an authority issue, a subject matter of said pre-existing, unreconciled data changes and said new data changes;
    determine an authority ranking, based on said subject matter, and
    deconflict said pre-existing, unreconciled data changes and said new data changes based on the authority ranking.

5. The system according to claim 1, wherein said data related to at least part of said asset comprises said asset information.

6. The system according to claim 1, wherein said hardware is configured to read said data related to at least part of said asset from one or more data-bearing tags embedded in and/or throughout at least part of said asset.

7. The system according to claim 6, wherein said one or more data-bearing tags embedded in and/or throughout at least part of said asset are capable of electromagnetic or other signaling.

8. The system according to claim 6, wherein the one or more data-bearing tags comprise one or more particles.

9. The system according to claim 8, wherein the one or more particles comprise scannable particles comprising coding.

10. The system according to claim 6, wherein the one or more data-bearing tags are visible.

11. The system according to claim 6, wherein the data-bearing tags are invisible.

12. The system according to claim 11, wherein the data-bearing tags are hidden from view, within a physical asset.

13. The system according to claim 6, wherein the data-bearing tags are sprayed on or integrated with a physical asset.

14. The system according to claim 6, wherein the data-bearing tags are encoded.

15. The system according to claim 6, wherein the asset is a virtual asset.

16. The system according to claim 6, wherein the asset is a digital asset.

17. The system according to claim 16, wherein the asset is a document.

18. A method for managing asset(s), comprising the following steps:
    receiving a first asset identifier and asset information using a control system, wherein the asset information is information about the asset other than the first asset identifier;
    reading data related to at least part of said asset;
    recording the first asset-specific identifier into a memory of the control system;
    providing an authentication and/or authorization protocol as a precondition to recording said first asset-specific identifier or said asset information;

recording, when the precondition is satisfied, said first asset-specific identifier or said asset information on one or more blockchain(s); and deconflicting pre-existing, unreconciled data changes arising during a network outage from new data changes based on whether the pre-existing, unreconciled data changes differ from the new data changes due to a presentation issue or an authority issue.

19. The method according to claim 18, comprising the following additional steps:

determining, when said pre-existing, unreconciled data changes and said new data changes differ due to a presentation issue, whether a similarity exists between said pre-existing, unreconciled data changes and said new data changes; and presenting, when the similarity is determined to exist, contextual information regarding that similarity to a user via an interface.

20. The method according to claim 18, comprising the following additional steps:

determining, when said pre-existing, unreconciled data changes and said new data changes differ due to an authority issue, a subject matter of said pre-existing, unreconciled data changes and said new data changes;

determining an authority ranking, based on said subject matter; and deconflicting said pre-existing, unreconciled data changes and said new data changes based on the authority ranking.

* * * * *